United States Patent
Hawkinson et al.

(10) Patent No.: US 7,760,359 B2
(45) Date of Patent: Jul. 20, 2010

(54) BEAM DETECTOR DISTANCE MEASUREMENT

(75) Inventors: Daniel C. Hawkinson, Elburn, IL (US); Robert J. Clow, North Aurora, IL (US)

(73) Assignee: Honeywell International Inc., Morristown, NJ (US)

( * ) Notice: Subject to any disclaimer, the term of this patent is extended or adjusted under 35 U.S.C. 154(b) by 237 days.

(21) Appl. No.: 11/953,291

(22) Filed: Dec. 10, 2007

(65) Prior Publication Data

US 2009/0147261 A1   Jun. 11, 2009

(51) Int. Cl.
  *G01N 21/00* (2006.01)
(52) U.S. Cl. .................... 356/438; 250/221; 250/222.2; 250/559.3; 356/432; 356/233; 356/5.01
(58) Field of Classification Search ......... 356/432–438, 356/5.01, 225, 233; 250/221, 222.1, 222.2, 250/559.3
See application file for complete search history.

(56) References Cited

U.S. PATENT DOCUMENTS

| 4,185,278 | A | * | 1/1980 | Lintelmann et al. | ......... 356/438 |
| 6,515,589 | B2 | * | 2/2003 | Schneider et al. | ........... 250/574 |
| 6,822,216 | B2 |   | 11/2004 | Lang et al. | |

* cited by examiner

*Primary Examiner*—Gregory J Toatley, Jr.
*Assistant Examiner*—Iyabo S Alli
(74) *Attorney, Agent, or Firm*—Husch Blackwell Sanders Welsh & Katz

(57) ABSTRACT

A projected beam smoke detector includes circuitry and control software to measure a distance a beam travels between the detector's transmitter and receiver. Either a time-based or a phase-based measurement methodology could be used. A sensitivity parameter of the detector could be set in response to the results of the measurement.

20 Claims, 3 Drawing Sheets

025
BEAM DETECTOR DISTANCE MEASUREMENT

FIELD

The invention pertains to projected beam smoke detectors. More particularly, the invention pertains to such detectors which incorporate distance measurement circuitry.

BACKGROUND

Projected beam-type smoke detectors are known and can be useful additions to regional monitoring systems, such as fire monitoring and alarm systems. Such detectors are disclosed, for example, in U.S. Pat. No. 6,822,216 B1 issued Nov. 23, 2004 entitled "Obscuration Detector". The '216 patent is assigned to the assignee hereof and incorporated by reference herein.

Detectors of the type noted above could be incorporated into monitoring systems such as disclosed in U.S. Pat. No. 6,691,172 B1 issued Feb. 10, 2004 and entitled "Communication System for Defining a Variable Group of Processors for Receiving a Transmitted Communication". The '172 patent is assigned to the assignee hereof and incorporated by reference herein.

Detector sensitivity is affected by beam travel distance in such detectors. It has been recognized that there is a need to establish a beam travel distance between a transmitter and a receiver of a projected beam-type detector on installation. Such distances can be manually measured at installation and a sensitivity parameter of the unit set accordingly.

It has also been recognized that where such detectors have a common housing for the transmitter and receiver, with the beam being reflected therebetween, that beam travel can be improperly interfered with by placing an obstruction having a reflective surface in the path of the beam.

There is thus a continuing need to more cost effectively carryout measurements of beam travel and to be able to recognize where interference with the beam has taken place. Preferably, such improved functionality could be automatically implemented using a transmitter and receiver present in such detectors to detect smoke.

DETAILED DESCRIPTION

Figure 1:
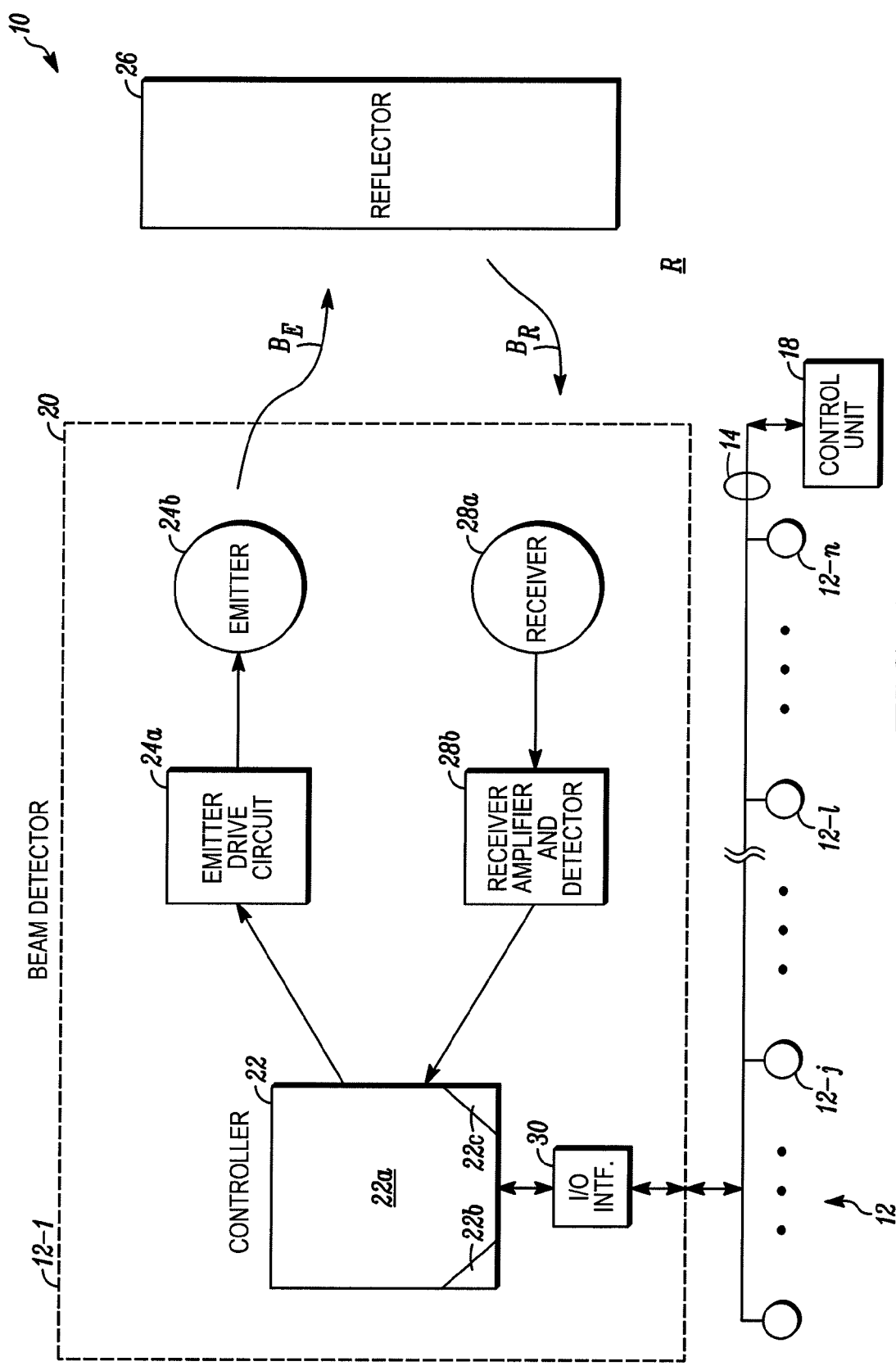
FIG. 1 is block diagram of an apparatus in accordance with the invention.

While embodiments of this invention can take many different forms, specific embodiments thereof are shown in the drawings and will be described herein in detail with the understanding that the present disclosure is to be considered as an exemplification of the principles of the invention, as well as the best mode of practicing same, and is not intended to limit the invention to the specific embodiment illustrated.

In one aspect of the invention, projected beam-type detectors could automatically measure the distance between a respective transmitter and detector and calculate the correct sensitivity for that distance. In the case of a reflective type of detector, with the transmitter and receiver in a common housing, the distance could be constantly or periodically measured to insure that no reflective obstruction has been placed in the path of the beam. If an obstruction is sensed then the device could indicate the condition locally and to a regional monitoring control unit.

The distance could be measured by pulsing the transmitter, which could be implemented as a mono-chromatic light source, and measuring the time it takes for the receiver to receive the signal. The distance would correspond to the time measures multiplied by the speed of light in air. It could also measured by modulating the light source and measuring the phase shift of the received signal relative to the transmitted signal. The phase shift would be proportional to the distance. In yet another aspect of the invention, the detector could contain a separate transmitter and receiver for the purpose of distance measurement if the requirements for distance measure are divergent to those of smoke detection.

FIG. 1 illustrates a system 10 in accordance with the invention. System 10 includes a plurality 12 of ambient condition detectors 12-1 . . . 12-n. The members of the plurality 12 are coupled by a medium 14, which could in part be wired and/or in part wireless all without limitation, to a regional monitoring control unit 18. Members of the plurality 12 could include smoke detectors, heat detectors, fire detectors, gas detectors all with limitation.

Regional monitoring system 12, 14 and 18 could be installed and configured, as those of skill will understand so as to monitor ambient conditions at a plurality of locations in a region R. For example, unit 18 could be configured so as to monitor the region R for fire, smoke or gas conditions all without limitation.

Exemplary detector 12-1 could be implemented as a projected beam smoke detector with a housing 20 that carries a controller 22. Controller 22 could include hard wired circuitry 22a, one or more programmable processor 22b and executable control software 22c encoded on a computer readable medium such as semi-conductor, magnetic, or optical storage. The processor(s) 22b could execute the software 22c to carry out one or more methods as described subsequently.

Controller 22 is also coupled to emitter drive circuitry 24a. Drive circuitry 24a is in turn coupled to a source or emitter 24b of a beam of radiant energy BE. For example, emitter 24b could be implemented as a laser or laser diode so as to emit mono-chromatic light.

A reflector 26 is displaced from detector 12-1 and positioned so that the incident beam BE reflects therefrom, as beam BR and returns to housing 20. The reflected beam BR is incident on sensor, or, receiver 28a, which could be a photodiode. Receiver 28a is coupled to amplifier and detector circuitry 28b. Circuitry 28b couples a signal indicative of reflected beam BR to controller 22.

Controller 22 in one operational mode can assess a level of smoke detected in the region R by beams BE and BR. In a second mode, which could be activated automatically and intermittently, controller 22 can measure travel distance of beam BE to reflector 26 and beam BR from reflector 26 as described subsequently relative to FIGS. 2, 3. Such processing could for example be implemented by executable software 22c when executed by processor(s) 22b.

Detector 12-1 can also include a wired or wireless input-output interface 30 for receiving commands, data and executable software from unit 18, and, for communicating responses and information thereto. Detector 12-1 could be implemented in an alternate configuration where sensor 28a and receiver 28b are located displaced from housing 20. In this configuration, beam BE is directly incident on receiver 28a which transfers a signal indicative thereof to detector 28b. No reflector is needed in this configuration.

Figure 2:
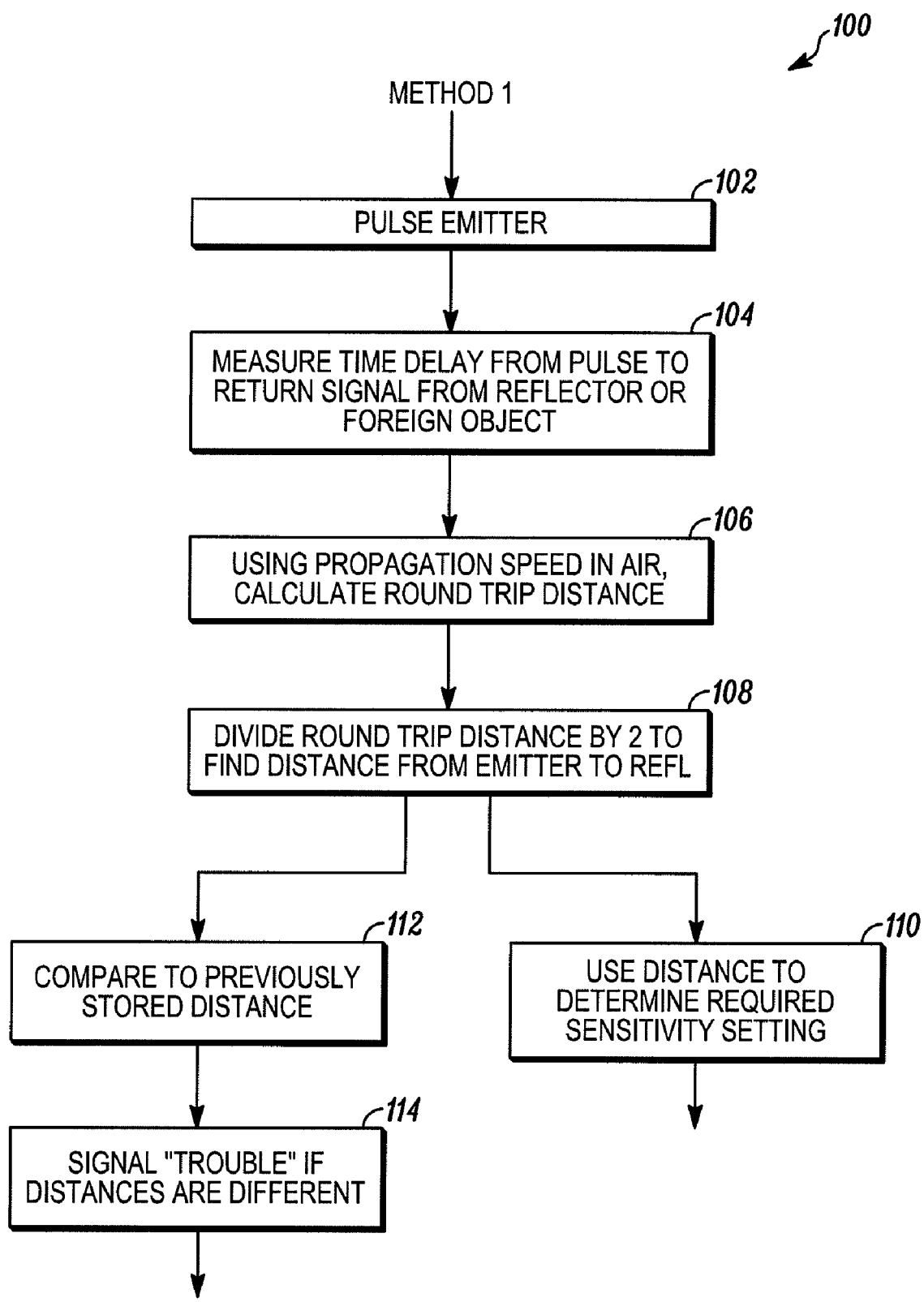
FIG. 2 is a flow diagram of a method in accordance with the invention.

FIG. 2 is a flow chart for a method 100. An emitter, such as emitter 24b is pulsed, as at 102. A time delay is measured for that pulse of radiant energy to be returned from reflector 26, or a foreign object in the beam's path as at 104. A distance parameter is determined, as at 106 by controller 22. As at 108, that parameter can be divided by 2 to establish a distance from emitter 24b to reflector 26.

The determined distance can be used to establish, or modify a sensitivity setting for the detector 12-1, as at 110. Alternately, the most recently determined distance can be compared to a previously stored distance, as at 112. Detector 12-1 can signal control unit 18 in the event the distances are different as at 114.

Figure 3:
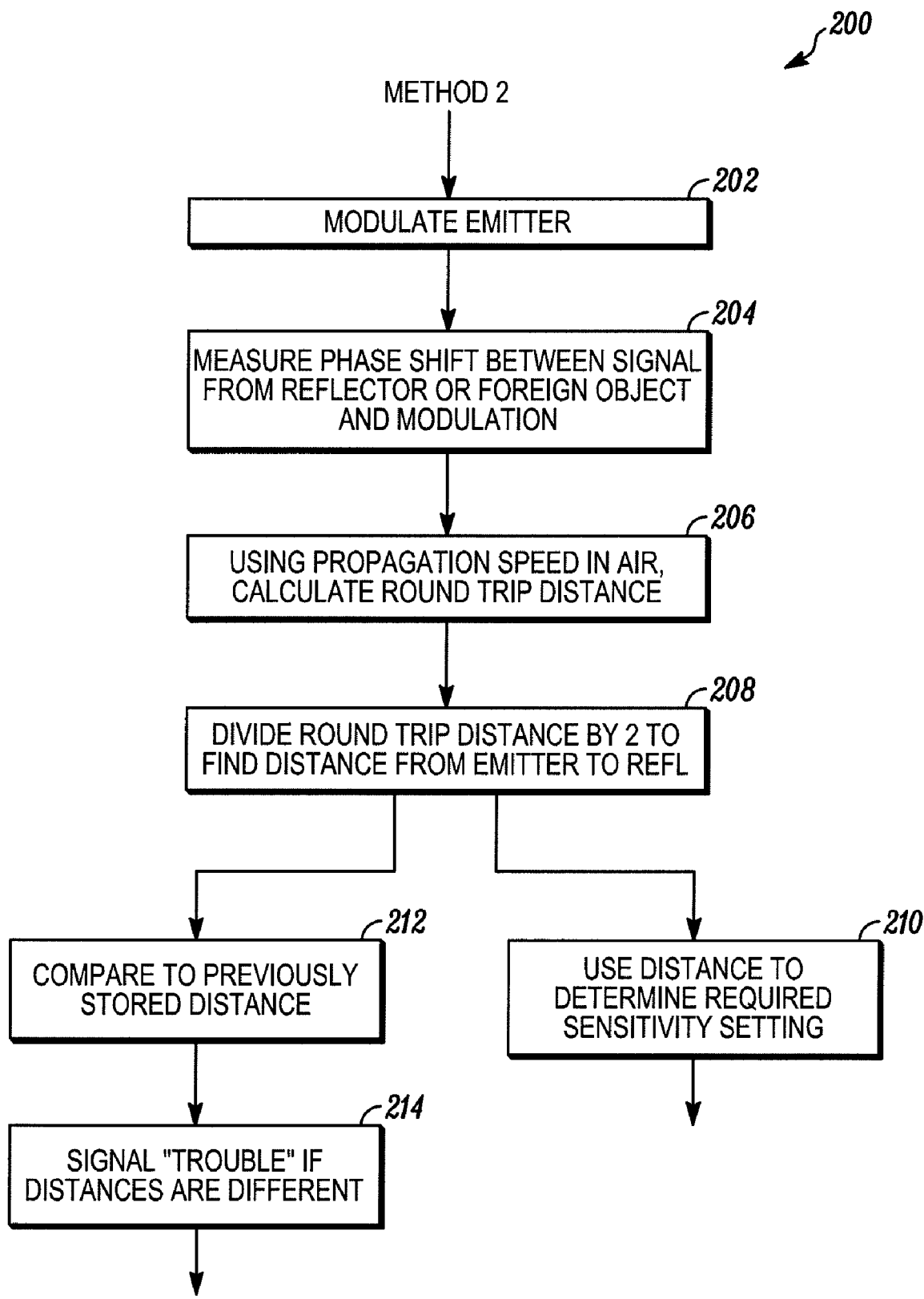
FIG. 3 a flow diagram of another method in accordance with the invention.

FIG. 3 is a flow diagram of a phase based method 200 in accordance with the invention. An emitter, such as emitter 24b is modulated as at 202. A phase shift is determined between signal emitter from emitter 24b and reflected signal sensed at 28a, b as at 204. Round trip distance, based on phase difference from emitter 24b to sensor 28a can then be established as at 206.

Distance for one way transit can be established as at 208. The sensitivity setting can be established as at 210. Alternately, the latest determined distance can be compared to a previously established and stored distance, as at 212. If the distances are different, detector 12-1 can transmit a "trouble" indicium to control unit 18 for follow-up and maintenance.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. An apparatus comprising:
a projected beam smoke detector, the detector includes a transmitter, the transmitter emits a beam of radiant energy, and a receiver of radiant energy with control circuitry coupled thereto, the receiver receives an incoming beam of incident energy from the transmitter, the received beam is substantially identical to the incident beam in the absence of smoke, and the control circuitry has at least first and second operational modes, the control circuitry responsive to the received beam of radiant energy, in one mode, detects a level of ambient smoke and in another automatically activated mode establishes a distance parameter associated with the received beam of radiant energy.

2. An apparatus as in claim 1 where the control circuitry includes a programmable processor and associated control software that establishes the distance parameter indicative of distance a beam of radiant energy, emitted by the transmitter, has traveled to the receiver.

3. An apparatus as in claim 2 where the circuitry establishes a sensitivity of the detector in response to the established distance parameter.

4. An apparatus as in claim 1 where the circuitry establishes a sensitivity of the detector in response to the established distance parameter.

5. An apparatus as in claim 1 where the control circuitry includes beam modulation circuitry coupled to the transmitter.

6. An apparatus as in claim 5 where the beam modulation circuitry in combination with the control circuitry, carries out one of a detection of elapsed time between beam transmission and reception, or, a detection of change of phase between beam transmission and reception.

7. An apparatus as in claim 3 where the beam modulation circuitry in combination with the control software, carries out one of a detection of elapsed time between beam transmission and reception, or, a detection of change of phase between beam transmission and reception.

8. An apparatus as in claim 6 where the detector includes: a housing; the housing carries at least the transmitter and the control circuitry.

9. An apparatus as in claim 8 with the housing also carrying the receiver.

10. A system comprising:
a plurality of ambient condition detectors, the detectors selected from a class which includes at least smoke detectors, fire detectors, and gas detectors;
at least one of the smoke detectors comprising a transmitter and a receiver of radiant energy with control circuitry coupled thereto, the transmitter emits a beam of radiant energy that is incident on the receiver in the absence of smoke, and the control circuitry having at least first and second operational modes, the control circuitry responsive to received radiant energy, in one mode, detects a level of ambient smoke and in another automatically activated mode establishes a distance parameter associated with the received incident beam of radiant energy.

11. A system as in claim 10 which includes a control unit coupled to the detectors and displaced therefrom, the control unit communicates with at least the one detector in establishing a sensitivity parameter therefore.

12. A system as in claim 11 where the at least one detector includes circuitry that carries out a distance measurement associated with the sensitivity parameter.

13. A system as in claim 12 which includes circuitry that senses smoke present on the path.

14. A system as in claim 13 which includes circuitry that compares the measured distance to a predetermined distance.

15. A method of establishing a sensitivity parameter of a smoke detector comprising:
providing a path for a beam of radiant energy, the path has a predetermined end;
projecting a beam of radiant energy along the path;
sensing the beam's arrival at the end of the path in the absence of smoke;
automatically establishing, responsive to the sensed beam arrival, a travel distance of the beam; and
establishing, responsive to the travel distance, a sensitivity parameter.

16. A method as in claim 15 where establishing the distance includes at least one of, an elapsed time, or, a phase change.

17. A method as in claim 15 which includes comparing the measured distance to a predetermined distance.

18. A method as in claim 17 where, responsive to the comparing, an indicator thereof is transmitted to a displaced location.

19. A method as in claim 17 which includes evaluating the presence of smoke on the path.

20. A method as in claim 19 which includes generating a smoke indicating indicium.

* * * * *